United States Patent [19]

Marcus

[11] 4,227,242
[45] Oct. 7, 1980

[54] ILLUMINATED VISOR MIRROR ASSEMBLY

[75] Inventor: Konrad H. Marcus, Holland, Mich.

[73] Assignee: Prince Corporation, Holland, Mich.

[21] Appl. No.: 21,726

[22] Filed: Mar. 19, 1979

[51] Int. Cl.² .............................................. B60Q 1/00
[52] U.S. Cl. ...................................... 362/61; 362/137; 362/140; 362/251; 362/74
[58] Field of Search ................. 362/61, 137, 140, 251, 362/74

[56] References Cited

U.S. PATENT DOCUMENTS

| | | | |
|---|---|---|---|
| 1,990,413 | 2/1935 | Michaelis | 224/29 A |
| 2,148,557 | 2/1939 | Hook | 224/29 A |
| 3,751,106 | 3/1975 | Mohler | 296/97 H |
| 3,926,470 | 12/1975 | Marcus | 362/61 |

Primary Examiner—Benjamin R. Padgett
Assistant Examiner—J. L. Barr
Attorney, Agent, or Firm—Price, Heneveld, Huizenga & Cooper

[57] ABSTRACT

A visor for a vehicle includes a covered and illuminated visor mirror integrally mounted therein which cover is pivotally mounted to a mirror frame and includes a detent for holding the visor in a partially opened position. In this position, a switch cooperating with the cover applies power to lights associated with the mirror in the assembly for providing a first level of illumination. The visor cover can be fully opened to a second position in which a switch cooperating between the cover and the mirror frame applies power to the lights to provide a second level of illumination from the lights.

15 Claims, 10 Drawing Figures

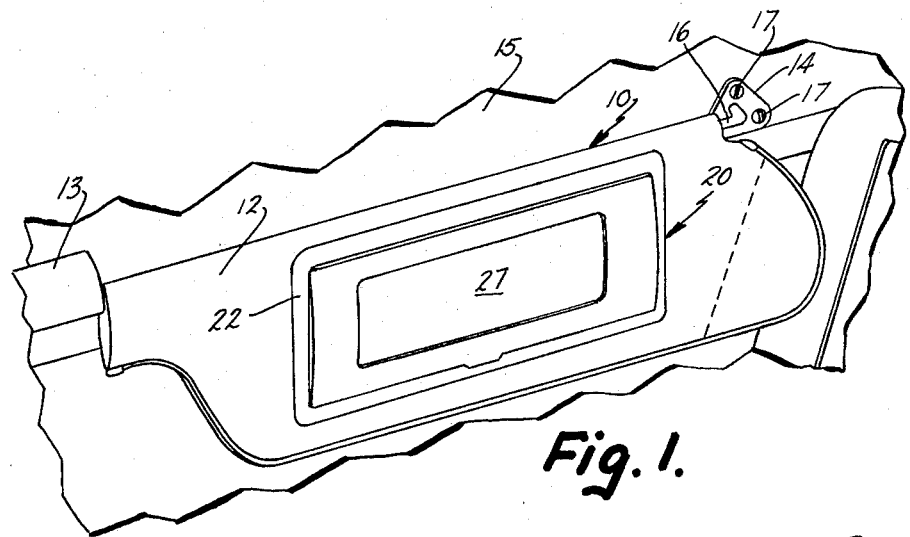
Fig. 1.
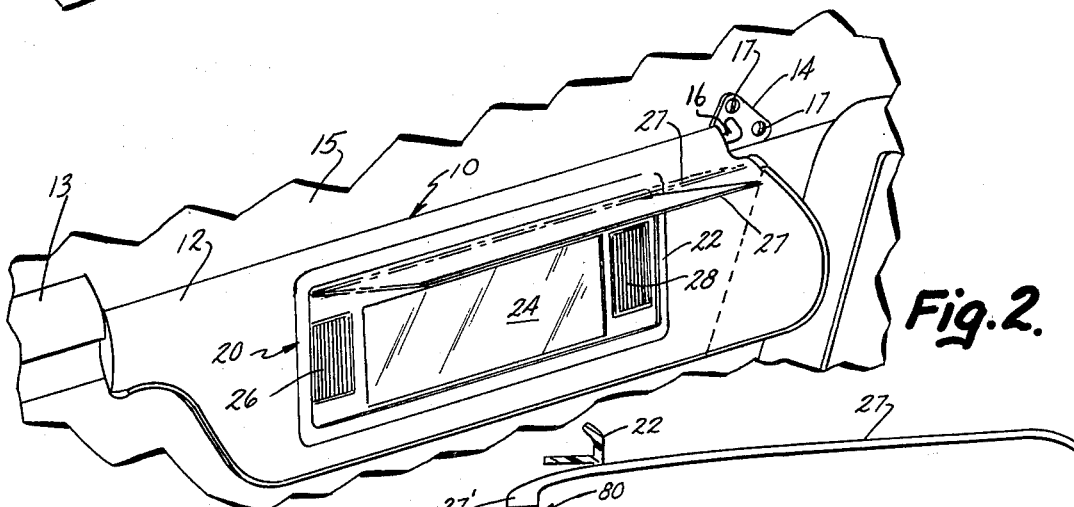
Fig. 2.
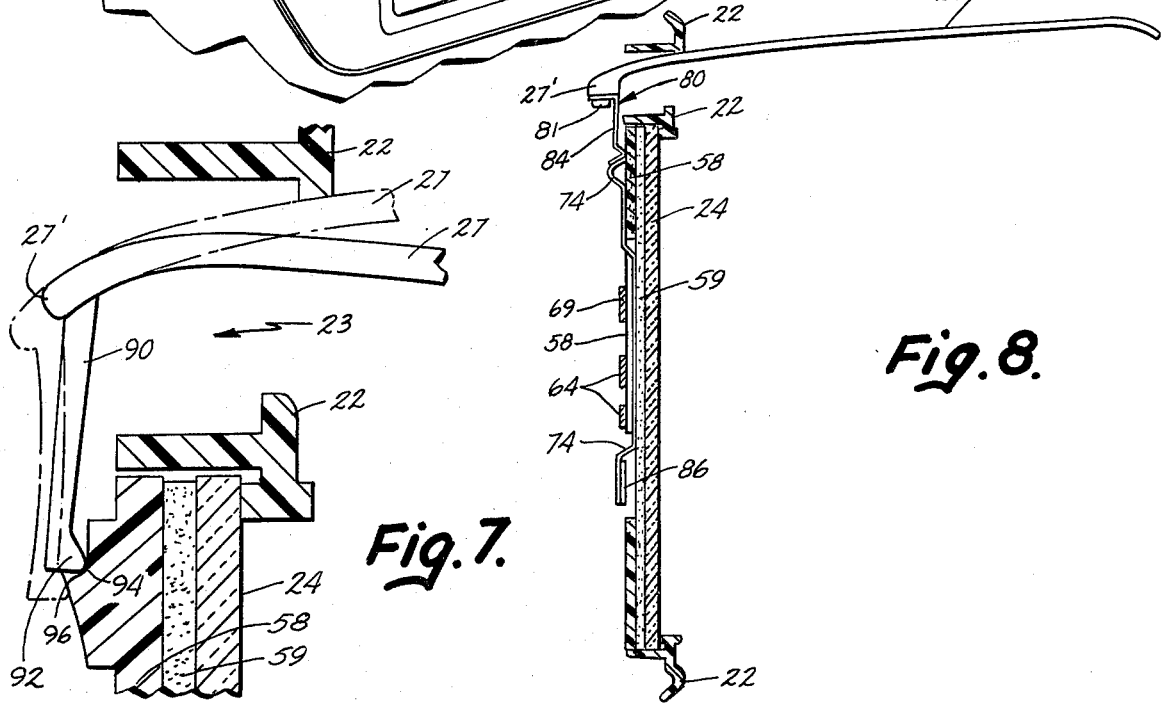
Fig. 7.
Fig. 8.

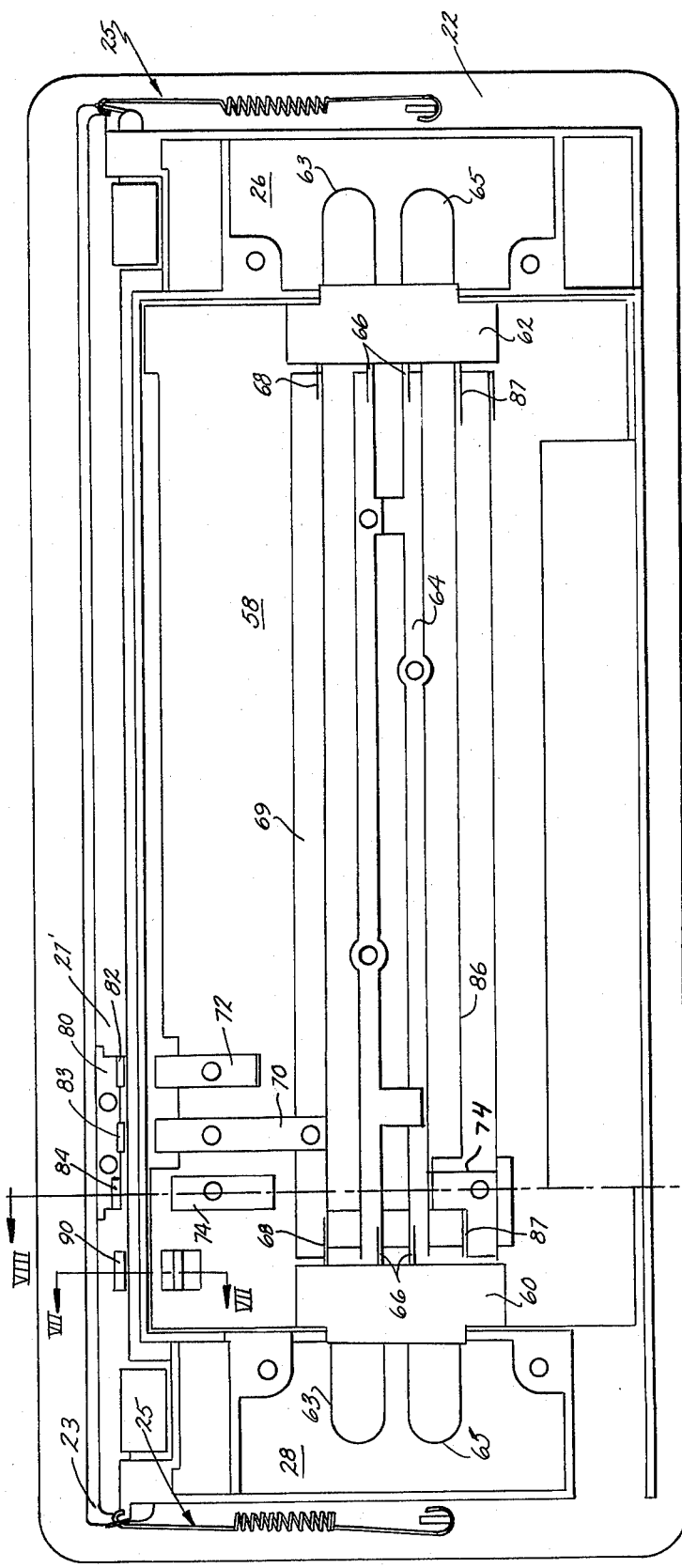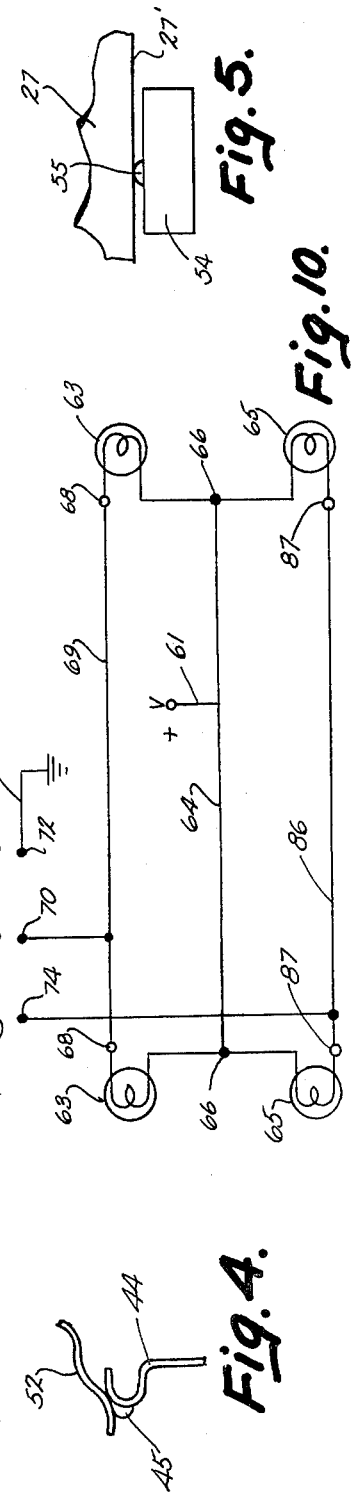

ILLUMINATED VISOR MIRROR ASSEMBLY

BACKGROUND OF THE INVENTION

The present invention relates to improvements in lighted and covered visor mirror assemblies.

Covered and illuminated visor mirrors mounted to or within the visor of a vehicle are becoming increasingly popular as a vehicle accessory. Covers are important to their design since, when the visor is normally employed as a sunshade without a cover on the mirror, the exposed mirror surfaces at the headlevel of the vehicle passenger or driver poses a significant hazard in the form of potential glass shattering which can result in serious cuts in the event of an accident. Additionally, covers are desirable since when the mirror is not in use, it can reflect ambient light and cause a distraction to the vehicle operator. Covers are desirable also from an appearance standpoint since the cover can be textured or upholstered to match the vehicle interior and the visor exterior, and when the mirror is not in use and the visor is used as a sunshade, the visor presents a clean and neat appearance with the mirror and mirror lights enclosed behind the cover.

Visor mirrors of the type to which the present invention pertains are represented by U.S. Pat. Nos. 3,926,470, issued Dec. 16, 1975, to Konrad H. Marcus, and 4,075,468, issued Feb. 21, 1978, to Konrad H. Marcus, both of which are assigned to the present assignee. With such illuminated visor mirrors, the covers can be moved from a fully closed to a fully opened position and held in these positions by a crank arm and spring arrangement. Improvements to this mounting arrangement for a visor cover have been made and are disclosed in U.S. Patent Application Ser. No. 958,968, filed Nov. 9, 1978, entitled COVERED VISOR MIRROR and assigned to the present assignee.

In these lighted mirror visor assemblies, it is desirable to have two levels of illumination for the user. Thus, in some instances, it is desirable to have a relatively low level of illumination which is less distracting to the vehicle operator but permits the passenger, for example, to check his or her appearance. The lighted visor mirror also can provide illumination to the interior of the vehicle for reading a map or the like, or for touching up ones makeup and in such cases, a greater level of illumination is desired. In the prior art, a two position switch has been provided which is manually actuated by the user of the visor mirror system to switch between dim and bright positions. Opening of the cover actuates a switch to automatically apply power to the lights but the degree of illumination is selected by the bright-dim switch. As can be appreciated, when the lighted visor mirror is used, the vehicle interior is darkened and if the bright-dim switch is left in the bright position, which frequently occurs, opening of the visor cover can cause momentary night blindness which can cause a significant distraction to the driver as well as the person using the mirror. Also, the provision of a separate bright-dim switch for controlling the intensity of illumination poses an inconvenience for the visor mirror user.

SUMMARY OF THE PRESENT INVENTION

The illuminated visor mirror assembly of the present invention overcomes the above noted problems by providing a visor cover which has switch means cooperating with the cover such that as the visor cover is initially opened, the lights provide a low level of illumination and as the visor is fully opened, the illumination is increased. In the preferred embodiment of the invention, a detent is provided between the cover and mirror frame to hold the cover in a first nearly opened position in which a lower level of illumination is provided. If a higher level of illumination is desired, the cover is opened slightly further to actuate switch means for providing a higher level of illumination.

Thus, with the present invention, when the mirror lights are first actuated, they are automatically in the dim position thereby preventing or greatly reducing the problem of momentary night blindness. Further, a separate bright-dim switch is eliminated and the cover itself is employed to control not only the actuation of the visor mirror lights but also the intensity of illumination provided by such lights.

These and other features, advantages, and objects of the present invention will become apparent upon reading the following description thereof together with reference to the drawings, in which:

BRIEF DESCRIPTION OF THE DRAWINGS

FIG. 1 is a fragmentary perspective view of a visor embodying the present invention shown with the cover in a closed position;

FIG. 2 is a fragmentary perspective view of the visor shown in FIG. 1 with the cover shown in a first opened position and in phantom form in a fully opened position;

FIG. 4 is an enlarged fragmentary side elevational view of the switch and detent incorporated in the embodiment shown in FIG. 3;

FIG. 5 is an enlarged fragmentary front elevational view of the additional switch employed in the embodiment shown in FIG. 3;

FIG. 6 is a rear elevational view of an alternative embodiment of the visor mirror assembly incorporating the present invention;

FIG. 7 is an enlarged fragmentary cross-sectional view of detent means shown in FIG. 6 taken along section lines VII—VII of FIG. 6;

FIG. 8 is a cross-sectional view taken along section lines VIII—VIII of FIG. 6;

FIG. 10 is an electrical circuit diagram in schematic form of the electrical circuit of the embodiment shown in FIGS. 6 through 9.

DETAILED DESCRIPTION OF THE PREFERRED EMBODIMENT

Figure 3:
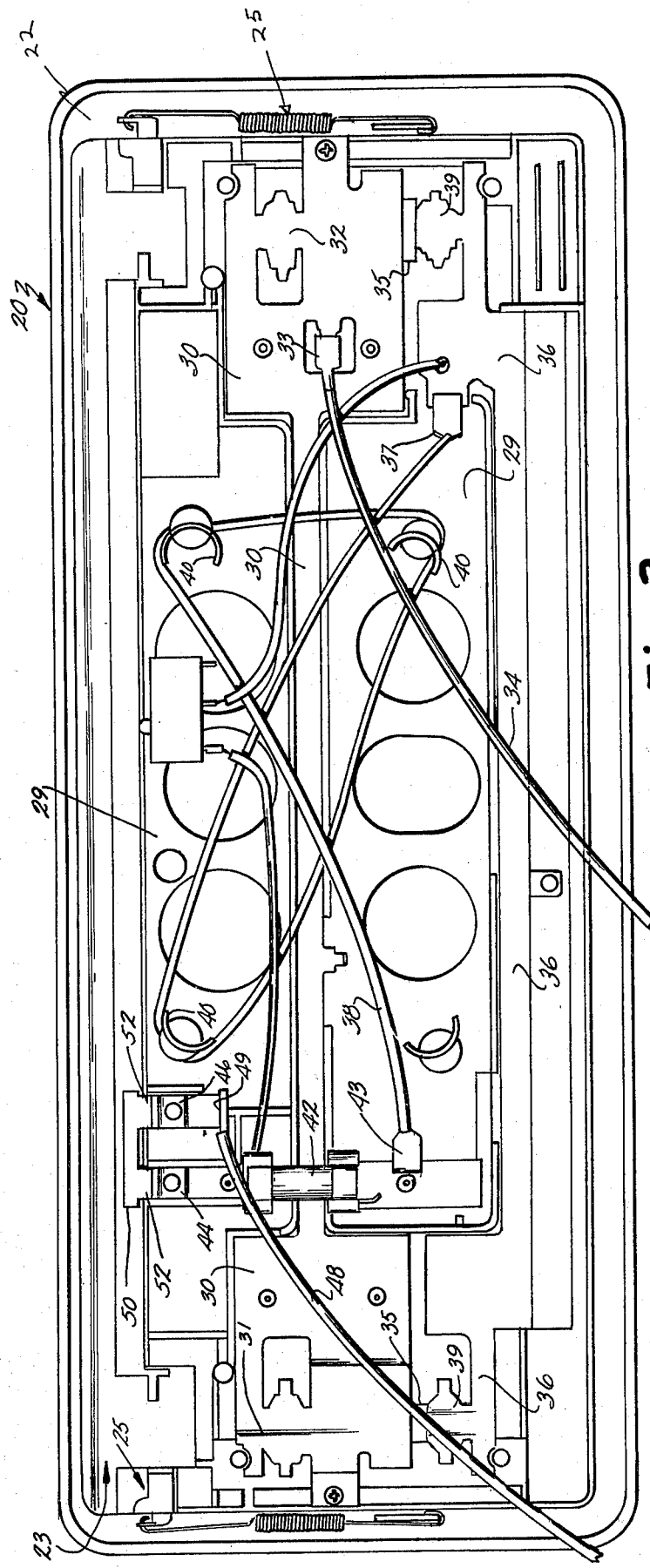
FIG. 3 is an enlarged rear elevational view of the visor mirror assembly shown in FIGS. 1 and 2.

Referring initially to FIGS. 1 and 2, there is shown a visor assembly 10 incorporating the present invention and shown mounted on the passenger side of a vehicle. The visor comprises a visor body 12 made of a core member injection molded of a suitable polymeric material such as polypropylene and integrally including therein a visor mirror frame assembly 20. The visor body 12 is supported at one end by a pivot bracket 14 from which extends a support rod 16 into the visor body. At the opposite end there is provided a post (not shown) which extends into a centrally located bracket 13 for releasably holding the visor in the position shown in FIG. 1. This permits the visor to be moved from the position shown to a side window if desired. Brackets 13 and 14 are mounted to the headliner 15 of the vehicle by conventional fastening means such as screws 17.

The visor mirror assembly 20 comprises a generally rectangular mirror frame 22 having a central rectangular opening into which there is secured a mirror 24 (FIG. 2). The frame 22 is fitted within a recess (not shown) formed in the visor body core and suitably secured therein by conventional fastening means. The overall construction of the visor is disclosed in previously mentioned U.S. Pat. No. 3,926,470, the disclosure of which is incorporated herein by reference.

The visor mirror assembly further includes a pair of generally rectangular lenses 26 and 28 (FIG. 2) positioned on opposite sides of the mirror 24 within the frame 22 for focusing light from lamps behind the lenses outwardly and in a converging manner toward the user of the mirror. These lenses serve also to prevent light from distracting the vehicle driver when the vehicle is in operation.

The mirror 24 and lenses 26 and 28 are selectively covered by means of a pivoted cover 27 which, as seen in FIG. 2, can be opened to a first position shown in solid lines or a second position shown in phantom lines. The cover is pivotally mounted to extend into a slot 23 in the mirror frame in the same manner as disclosed in the above identified application. The cover, however, is employed to not only actuate the lamps positioned behind lenses 26 and 28 but also to control the degree of illumination from the lamps. Thus, in the first position of the cover, the lamps are at a first lower level of illumination. The cover is held in this position by detent means cooperating between the cover and the mirror frame and when moved to the second fully opened position, the lamps provide a second higher level of illumination to provide a greater amount of illumination to the user. The structure for selectively holding the cover in first and second positions and for applying electrical power to the lamps associated with and positioned behind lenses 26 and 28 for one embodiment of the invention is now presented in conjunction with FIGS. 3 through 5.

Secured between the edges of mirror frame 22 is mounting board 29 made of an insulating material such as polycarbonate. A first electrically conductive strip 30 is secured to board 29 and has a bulb receiving socket 31 at one end and a similar socket 32 at its opposite end. The socket receives one contact of a six candle power cartridge-type lamp 35 No. 212-2 commonly used in the automotive industry. Electrical power from the vehicle's power supply is applied to strip 30 by means of an electrical conductor 34 attached to the strip 30 by means of a clip-on contact 33. The remaining terminals for the cartridge-type bulbs 35, which are positioned behind lenses 26 and 28, are each coupled to sockets 39 at opposite ends of a second conductive strip 36 also supported by board 29.

A resistance wire 38 is coupled to strip 36 by means of connector 37 and is strung around support posts 40 extending from board 29. The end of resistance wire 38, remote from connector 37, is coupled to one end of a cartridge-type fuse 42 by connector 43. The remaining end of fuse 42 is coupled to a first electrical contact 44. Contact 44 is supported on board 29. Positioned adjacent and spaced from contact 44 is a second contact 46 electrically coupled to a conductor 48 by means of a connector 49. Conductor 48 is the ground return line for the vehicle. Thus, the electrical current path for the lamps 35 includes conductor 34, strip 30, lamps 35, and resistance wire 38 coupled to the first contact 44. The beryllium copper contacts 44 and 46 are selectively electrically shorted together by means of a shorting strip 50 having a pair of configured legs 52 made of beryllium copper and attached to the edge of cover 27 such that when the cover is in an opened position, legs 52 electrically contact contacts 44 and 46 (FIG. 4) to complete the electrical current path to conductor 48.

Contacts 44 and 46 are U-shaped and legs 52 are generally S-shaped to cooperate with cover 27 in its first position as seen in FIG. 4. In this position, the legs 52 engage detent means comprising projections 45 extending from each of the contacts 44 and 46. When the cover is opened to a first position, electrical current is applied to illuminate the lamps but the current path includes the resistance wire 38 and therefore the lamps are illuminated at a first lower level of illumination. The cover can be more fully opened whereupon the curved legs of contact 50 ride over the projections 45 on contacts 44 and 46 and in which an edge 27' (FIG. 5) of the cover actuates a second switch means comprising a MICROSWITCH 54 mounted also to the board 29 along the upper edge thereof such that a contact actuator 55 is engaged by the edge 27' of the cover when in a fully opened position shown in phantom form in FIG. 2. In this position, switch 54 is closed. Switch 54 has one contact coupled to the fuse 42 and a second contact coupled to strip 36 such that when the switch is in a closed position (with cover 27 in a fully opened position) the resistance wire 38 is short circuited by switch 54 thereby providing full current to the lamps 35 for providing a second increased level of illumination.

The cover 27 is urged toward the first and second positions by the crank arm and spring assemblies 25 extending between the cover 27 and frame 22 on opposite ends (FIG. 3). This holds the cover in the first position against the detent means and also holds cover 27 in a fully opened or closed position. Mechanism 25 is disclosed in greater detail in the above identified and referenced patent application.

Figure 9:
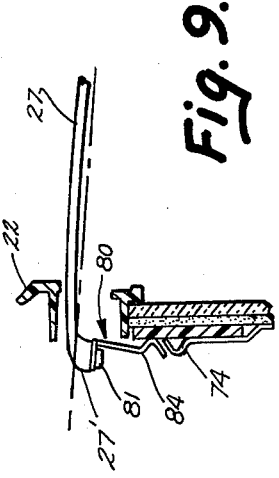
FIG. 9 is a fragmentary cross-sectional view of the structure shown in FIG. 8 with the visor mirror cover shown in a different position.

Having described the first embodiment of the present invention, an alternative embodiment of the invention is described in conjunction with FIGS. 6 through 10. The mirror frame and cover are identical to that shown in the first embodiment and are identified by the same reference numerals. In FIG. 6, the mirror frame 22 supports an insulated backing plate 58. As best seen in FIG. 7, a foam pad 59 is positioned between backing plate 58 and mirror 24 and is adhered to the rear surface of the mirror to provide a shatterproof and shock resistant mounting for the mirror within frame 22. Mounted to plate 58 is a pair of dual bulb sockets 60 and 62 at opposite ends and positioned generally behind lenses 26 and 28. Sockets 60 and 62 each receive a pair of lamps 63 and 65 to provide either low or high illumination depending on whether one lamp of each of the sockets is actuated or both lamps are actuated, respectively. The lamps 63, 65 are each conventional two candle power lamps, G. E. type 158, as are the sockets 60 and 62. Power from the vehicle's power supply is coupled by a conductor 61 (FIG. 10) coupled to a first conductive strip 64 supported on board 58 and which is coupled to a first contact 66 on each of the lamp sockets 60 and 62 common to each of the lamps 63, 65 therein. The remaining contacts 68 of the upper lamps 63 are coupled to each other by a second conductive strip 69 supported on plate 58. Strip 69 is also coupled to a first electrical contact 70 extending upwardly adjacent the top edge of support plate 58. Spaced from and adjacent contact 70 is a second strip contact 72 also mounted on the insulated backing plate 58 and to which the ground return wire 71 (FIG. 10) is coupled and which extends to the vehicle's ground. A conductive shorting bar 80 is mounted on the edge 27' of cover 27 by fastening means such as screws 81 as best seen in FIGS. 8 and 9. Bar 80 has three fingers 82, 83, and 84. Fingers 82 and 83 short out contacts 70 and 72 to complete the current path when the cover is in a first, partially opened position as shown in FIG. 2 by completing the current path to the upper bulbs 63 thereby providing a first lower level of illumination.

As seen in FIG. 6, a third strip contact 74 does not extend to the edge of board 58 as far as contacts 70 and 72 and thus with cover 27 in the first position, bar 80 only shorts out contacts 70 and 72. Bar 80 is configurated to include a U-shaped end for each of contacts 82, 83, and 84 as seen in FIGS. 8 and 9. Contacts 70, 72, and 74 are similarly shaped with rounded U-shaped ends. Contacts 82 and 83 ride over mating contacts 72 and 70, respectively, as the cover is moved to a fully opened position such that contact 84 engages contact 74 as shown in the sequence of FIGS. 1 and 8. Contacts 70, 72, and 74 and bar 80 are made of beryllium copper to provide the desired resiliency and electrical contact. Cover 27 is held in the first position shown in FIG. 9 by detent means shown in FIGS. 6 and 7 and now described.

Integral with cover 27 is an arm 90 having a triangular shaped tip 92. Arm 90 extends rearwardly from the upper edge 27' of cover 27 such that when the cover is opened, tip 92 rides downwardly along the rear surface of plate 58 and engages detent means comprising a raised projection including a notch 94 and a curved surface 96 below notch 94. The crank arm and spring mechanism 25 at opposite ends of the cover 27 urge the cover into this first, opened position which is shown in solid lines in FIG. 7 and shown in FIG. 9. The camming means comprising member 92 and notch 94 hold the cover in this first position with only lamps 63 illuminated. As the operator raises the cover to the fully opened position, member 92 rides over curved camming surface 96 with the mechanism 25 urging the cover into a fully opened position shown in phantom in FIGS. 2 and 7 and shown in FIG. 8. At the same time, contact 84 moves as seen in FIGS. 9 and 8 from a nonengaging position with its strip contact 74 mounted to plate 58 to the engaging position shown in FIG. 8 to couple contact 74 to the ground return wire coupled to contact 72. Contact 74 in turn is coupled to a third conductive strip 86 mounted on plate 58. Strip 86 in turn is coupled to the remaining contacts 87 associated with the lower lamps 65 of the mirror assembly. Thus, with the cover in the fully opened position, both lamps 63 and 65 of each pair of lamps are illuminated providing a second, higher level of illumination.

The electrical circuit is shown in FIG. 10 where the vehicle's power source is indicated as +V and is coupled to strip 64 to the contacts 66 common with each of the four bulbs 63 and 65. The shorting bar 80 having contacts 82, 83, and 84 selectively couple contacts 70 and 74 to contact 72 which is coupled to the system ground. Contact 70 is coupled to the terminal 68 of each of the upper lamps 63 by strip 69 while last-to-make contact 74 is coupled to the terminals 87 associated with the lower lamps 65 by strip 86. Thus, as seen in FIG. 10, the lamps 63 and 65 are actuated in a parallel circuit with the first circuit being actuated to activate the upper bulbs 63 when the cover is in its first position and the second parallel circuit being activated to actuate the lower bulbs 65 and the upper bulbs 63 when the cover is in a fully opened position.

In the preferred embodiments of the invention described above, cover 27 is moved to a first, opened position and releasably held in that position by detent means cooperating between the cover and mirror frame. The first, opened position corresponds roughly to 100° while the second or fully opened position corresponds to approximately 110°–115°. Naturally, the visor assembly cover could open to different angular positions than the particular angles of the preferred embodiments. Also, the control of the illumination can be continuously or incrementally increasing as the cover is opened from the fully closed position. The control circuits shown in FIGS. 3, 6, and 10 are illustrative of one manner by which the invention can be practiced. These and various other modifications to the preferred embodiments of the invention will become apparent to those skilled in the art but will fall within the spirit and scope of the invention as defined by the appended claims.

The embodiments of the invention in which an exclusive property or priviledge is claimed are defined as follows.

1. A lighted and covered mirror assembly for a visor comprising:
   a mirror frame including a mirror mounted therein;
   lamp means and means for mounting said lamp means adjacent said mirror for directing illumination outwardly therefrom;
   cover means movably attached to said mirror frame for movement between a closed position covering said mirror and an opened position exposing said mirror and including first and second opened positions; and
   means for applying electrical power to said lamp means including switch means actuated by said cover means when moved from said closed position to said first opened position for providing a first level of illumination from said lamp means and for providing a second level of illumination from said lamp means when said cover is moved toward the second, opened position.

2. The apparatus as defined in claim 1 wherein said cover is opened a greater extent when in said second, opened position and the second level of illumination is greater than the first level of illumination.

3. The apparatus as defined in claim 2 and further including means extending between said cover and frame for releasably holding said cover in said first, opened position.

4. The apparatus as defined in claim 3 wherein said means for releasably holding said cover comprises detent means associated with said mirror frame and a detent engaging member extending from said cover and cooperating with said detent means for releasably holding said cover in said first position.

5. The apparatus as defined in claim 1 wherein said means for applying electrical power includes a first cover actuated switch coupled between a source of electrical power and said lamp means, resistance means coupled in series with said lamp means and a second cover actuated switch coupled in parallel with said resistance means wherein said first switch is actuated to apply power to said lamps through said resistance means when said cover is moved from a closed position and said second switch is actuated to electrically short said resistance means when said cover is moved from said first, opened position toward said second, opened position.

6. The apparatus as defined in claim 1 wherein said lamp means comprises at least a pair of lamps and said switch means comprises a first switch coupled from a source of operating power to a first of said lamps for actuating the first of said lamps when said cover is moved from a closed position and a second switch coupled from a source of operating power to the second of said lamps for actuating a second of said pair of lamps when said cover is moved from said first, opened position toward said second, opened position.

7. A lighted and covered mirror assembly for a visor comprising:
   a mirror frame for receiving a mirror therein;
   lamp means associated with said mirror frame for directing illumination outwardly therefrom;
   cover means movably attached to said mirror frame for movement between a closed position and one or more opened positions; and
   an electrical control circuit including actuating means, said actuating means actuated by the movement of said cover means to activate said lamp means and to increase the illumination from said lamp means as said cover is moved from a closed position toward progressively greater opened positions.

8. The apparatus as defined in claim 7 and further including means extending between said cover means and said frame for releasably holding said cover in a first, opened position in which said control circuit activates said lamp means to provide a first level of illumination.

9. The apparatus as defined in claim 8 wherein said cover can be opened a greater extent than said first, opened position and when opened a greater extent, said control circuit activates said lamp means to provide a level of illumination greater than the first level of illumination.

10. The apparatus as defined in claim 9 wherein said means for releasably holding said cover comprises detent means associated with said mirror frame and a detent engaging member extending from said cover and cooperating with said detent means for releasably holding said cover in said first position.

11. The apparatus as defined in claim 7 wherein said control circuit includes a first cover actuated switch coupled between a source of electrical power and said lamp means, resistance means coupled in series with said lamp means and a second cover actuated switch coupled in parallel with said resistance means wherein said first switch is actuated to apply power to said lamps through said resistance means when said cover is moved from a closed position and said second switch is actuated to electrically short said resistance means when said cover is moved from said first, opened position toward a position opened a greater extent than said first position.

12. The apparatus as defined in claim 7 wherein said lamp means comprises at least a pair of lamps and said control circuit comprises a first switch coupled from a source of operating power to a first of said lamps for actuating the first of said lamps when said cover is moved from a closed position and a second switch coupled from a source of operating power to the second of said lamps for actuating said second of said lamps when said cover is moved from said first, opened position toward a greater opened position.

13. A covered, illuminated mirror assembly for installation in a vehicle comprising:
   a mirror frame adapted to be mounted to a vehicle for supporting a mirror therein;
   a cover pivotally mounted to said mirror frame for movement between a closed position covering a mirror mounted within said frame and to one or more opened positions;
   lamp means supported by said mirror frame for directing illumination outwardly therefrom; and
   means coupled between said frame and cover for applying electrical power to said lamp means in an increasing amount as said cover is moved from a closed position to opened positions such that the illumination from said lamp means increases as the cover is progressively opened.

14. The assembly as defined in claim 13 wherein said means for applying electrical power includes electrical circuit means cooperating between said cover and said frame wherein said circuit means is actuated by movement of said cover for selectively applying power to said lamp means.

15. The assembly as defined in claim 14 wherein said circuit means includes switch means actuated by said cover.

* * * * *